United States Patent [19]

Domenico

[11] B 3,923,822

[45] Dec. 2, 1975

[54] 6-FLUORO-3,5-DIHALO-2-PYRIDINOLS

[75] Inventor: Penelope B. Domenico, Fairfax, Va.

[73] Assignee: The Dow Chemical Company, Midland, Mich.

[22] Filed: Dec. 17, 1973

[21] Appl. No.: 425,572

[44] Published under the Trial Voluntary Protest Program on January 28, 1975 as document no. B 425,572.

[52] U.S. Cl. .............................. 260/297 R; 424/263
[51] Int. Cl.² ......................................... C07D 213/64
[58] Field of Search ................................. 260/297 R

[56] References Cited
UNITED STATES PATENTS

| | | | |
|---|---|---|---|
| 3,244,586 | 4/1966 | Rigterink | 260/294.8 K |
| 3,249,419 | 5/1966 | Martin | 260/295 R |
| 3,686,191 | 4/1972 | Nishimura et al. | 260/294.8 K |

OTHER PUBLICATIONS

Chem. Abst., Vol. 68, No. 5, Item No. 21, 842v, Jan. 29, 1968.

*Primary Examiner*—Alan L. Rotman
*Attorney, Agent, or Firm*—S. Preston Jones

[57] ABSTRACT

The compounds 6-fluoro-3,5-dibromo-2-pyridinol and 6-fluoro-3,5-dichloro-2-pyridinol have been prepared. 6-Fluoro-3,5-dibromo-2-pyridinol has been found to prevent the hatching of housefly eggs. 6-Fluoro-3,5-dichloro-2-pyridinol has been found to be an active common housefly control agent as well as being a selective post-emergent crabgrass control agent.

2 Claims, No Drawings

6-FLUORO-3,5-DIHALO-2-PYRIDINOLS

PRIOR ART

Various halo pyridinols have been taught in the prior art. For example, various halo-2-pyridinols are taught in Rev. Trav. Chem. 69, 685 and 1281 (1950) and 74, 59 (1955); 6-fluoro-3,5-dichloro-2,4-dihydroxypyridine is taught in British Pat. No. 1,161,492; various halo-2-pyridinols are taught in CAVA, Final Report by Ohio State University Research Foundation on Synthesis of Heterocyclic Compounds (Dec. 1, 1957). Various other halopyridinols are taught in J. Chem. Soc. 83, 400; Chemical Abstracts 45, 8013 (1951) and U.S. Pat. Nos. 3,244,586 (167–33), 3,249,419 (71–2.5), 3,249,619 (260–295), 3,535,328 (260–296) and 3,686,191 (260–294.8k).

SUMMARY OF THE INVENTION

The present invention is directed to the compounds 6-fluoro-3,5-dibromo-2-pyridinol and 6-fluoro-3,5-dichloro-2-pyridinol. 6-Fluoro-3,5-dibromo-2-pyridinol has been found to prevent the hatching of housefly eggs and 6-fluoro-3,5-dichloro-2-pyridinol has been found to be an active common housefly control agent as well as a selective post-emergent crabgrass control agent.

The compounds of the present invention are crystalline solids which are substantially insoluble in water and are soluble in many common organic solvents.

The compound 6-fluoro-3,5-dibromo-2-pyridinol can be prepared by reacting 6-fluoro-2-pyridinol with bromine at atmospheric pressure in the presence of a solvent or reaction medium such as, for example, benzene, carbon tetrachloride or glacial acetic acid. The amount of the reactants to be employed is not critical, some of the product being formed when employing any proportions. The reaction consumes the reactants, however, in the ratio of 2 moles of the bromine per mole of the pyridinol and the employment of such proportions is preferred. In carrying out this reaction, the 6-fluoro-2-pyridinol is dissolved in a solvent such as glacial acetic acid and a solution of bromine in glacial acetic acid is slowly added thereto while the mixture is maintained at about room temperature from about 1 to about 10 hours. Upon completion of the reaction, the reaction mixture is poured into water and crude solid product which forms is recovered by filtration or other conventional method for recovering solids from liquids, water washed and dried. If desired, the product can be further purified by solvent recrystallization from a solvent such as hot benzene.

The compound 6-fluoro-3,5-dichloro-2-pyridinol can be prepared by hydrolyzing 3,5-dichloro-2,6-difluoropyridine with a sodium hydroxide-water solution under autogeneous pressure and at a temperature of from about 100°–200°C. In carrying out the reaction, 3,5-dichloro-2,6-difluoro pyridine is placed in a pressure vessel with the sodium hydroxide and water. The vessel is sealed and the mixture heated for about 2–3 hours. The reaction mixture is thereafter filtered hot to remove any insolubles, acidified, cooled and refiltered. The crude solid product which remains can be purified by recrystallization from a solvent such as hot benzene.

DESCRIPTION OF SOME OF THE PREFERRED EMBODIMENTS

The following examples illustrate the present invention and the manner by which it can be practiced, but, as such, should not be construed as limitations upon the overall scope of the same.

EXAMPLE I 3,5-Dichloro-2,6-Difluoro Pyridine

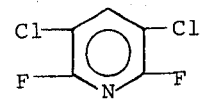

This compound is employed as a starting material in preparing 6-fluoro-3,5-dichloro-2-pyridinol.

A solution was prepared by adding 20 grams (0.092 mole) of 2,3,5,6-tetrachloro pyridine and 16 grams (0.092 mole) of dried potassium fluoride to 40 milliliters of dimethylformamide. The mixture was refluxed at the reflux temperature of the mixture for 6 ½ hours. The reaction mixture was poured into an equal amount of water with agitation. A dark precipitate formed which was separated and extracted with hexane. The hexane layer was separated and passed through activated charcoal and filtered through diatomaceous earth. The hexane was removed by aspiration leaving 16.9 grams (92 percent yield) of the 3,5-dichloro-2,6-difluoro pyridine product. Infrared analysis of the product confirmed the structure.

EXAMPLE II

6-Fluoro-3,5-dichloro-2-pyridinol

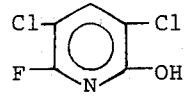

To a 500 milliliter nickel lined reaction bomb was added 10 grams (0.05 mole) of 3,5-dichloro-2,6-difluoropyridine (prepared as above, Example I), 4.4 grams (0.11 mole) of sodium hydroxide and 65 milliliters of water. The bomb was sealed and the reaction carried out at 125° C. for 2 ½ hours. At the completion of the reaction, the bomb was opened and the contents, which consisted of a crystalline material and a dark liquid, were removed. The mixture was heated until the crystals went into solution. Activated charcoal was added and the mixture filtered through diatomaceous earth. The solution was acidified, cooled and filtered to recover the crude 6-fluoro-3,5-dichloro-2-pyridinol product as a solid. The product was purified by recrystallization from hot benzene and recovered as white crystals melting at 136°–140°C. The product was recovered in a yield of 3.2 grams (31.7 percent). The structure of the product was analyzed by infrared. Upon elemental analysis, the product was found to have carbon, hydrogen, chlorine, fluorine and nitrogen contents of 33.6, 1.3, 37.2, 10.7 and 7.7 percent, respectively, as compared with the theoretical contents of 33.0, 1.1, 38.9, 10.5 and 7.7 percent, respectively, calculated for the above named compound.

EXAMPLE III

6-Fluoro-3,5-dibromo-2-pyridinol

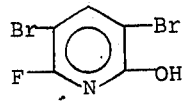

A solution was prepared by dissolving 10 grams (0.09 mole) of 6-fluoro-2-pyridinol in 50 milliliters of glacial acetic acid. A solution consisting of 28.2 grams (0.18 mole) of bromine in 10 milliliters of glacial acetic acid was added thereto with stirring over a period of 45 minutes. During the addition, the temperature was held at ~25°C. Upon the completion of the bromine addition, the mixture was stirred an additional 2 hours and allowed to stand overnight (~15 hours). The reaction mixture was poured into water and the solid which formed was removed by filtration, washed and partially dried. The crude 6-fluoro-3,5-dibromo-2-pyridinol was purified by recrystallization from hot benzene. The product was in the form of light yellow crystals melting at 175°–176°C. and was recovered in a yield of 16 grams (67 percent). Upon analysis, the product was found to have carbon, hydrogen, bromine and nitrogen contents of 22.8, 0.9, 58.7 and 5.1 percent, respectively, as compared with the theoretical contents of 22.2, 0.7, 59.0 and 5.2 percent, respectively, calculated for the above named compound.

The 6-fluoro-3,5-dichloro-2-pyridinol compound of the present invention can be employed as a toxicant for the kill and control of common house flies. In addition, the compound can be employed for the selective postemergent control of crabgrass in the presence of other plants such as, for example, soybeans, white winter wheat and corn.

For such uses, the compound can be employed in an unmodified form or dispersed on a finely divided solid and employed as dust. Such mixtures can also be dispersed in water with or without the aid of a surface active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

Excellent results are obtained when employing compositions containing the toxicant in concentrations of from about 0.1 to about 10,000 parts or more by weight of the compound per million parts of such compositions. Alternatively, the compound can be incorporated in the diets of many animals and be released from the animal in its unmodified form with the animals body waste. By this procedure, fly larvae are prevented from forming in such waste.

In a representative operation, 6-fluoro-3,5-dichloro-2-pyridinol, when applied, as the sole toxicant, in an aqueous dispersion at 4,000 parts per million parts of the ultimate dispersion, was found to selectively give 100 percent kill and control of crabgrass in the presence of corn, soybeans and white winter wheat.

In another operation, 6-fluoro-3,5-dichloro-2-pyridinol, when applied, as the sole toxicant, in an aqueous dispersion at 500 parts per million parts of the ultimate dispersion, was found to give 50 percent kill and control of common houseflies (Musca domestica).

In other representative operations, 6-fluoro-3,5-dibromo-2-pyridinol was found to completely prevent hatching of housefly eggs inoculated into the feces of two-week old chicks which had been fed a standard poultry dirt containing 500 parts of the pyridinol compound per million parts of the ultimate diet.

What is claimed is:
1. 6-Fluoro-3,5-dibromo-2-pyridinol.
2. 6-Fluoro-3,5-dichloro-2-pyridinol.

* * * * *